Dec. 23, 1941.   H. O. ROOSENSTEIN ET AL   2,267,289
TRANSMISSION SYSTEM
Filed Feb. 11, 1939
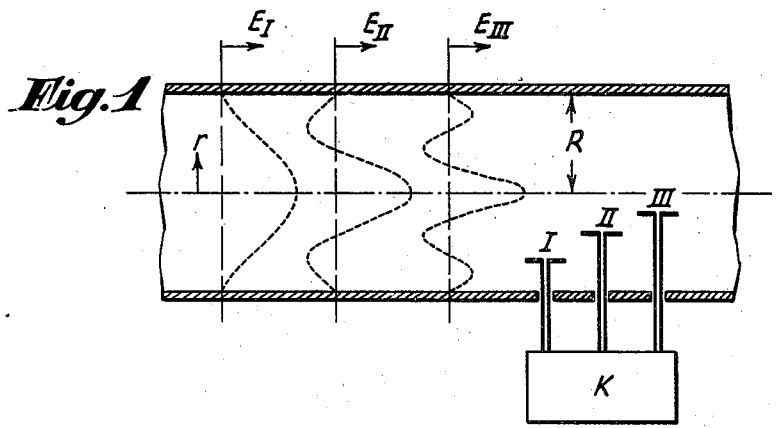
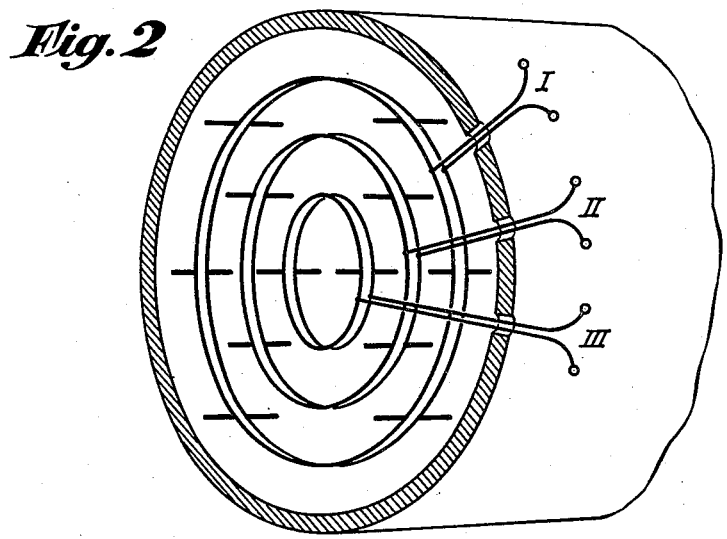
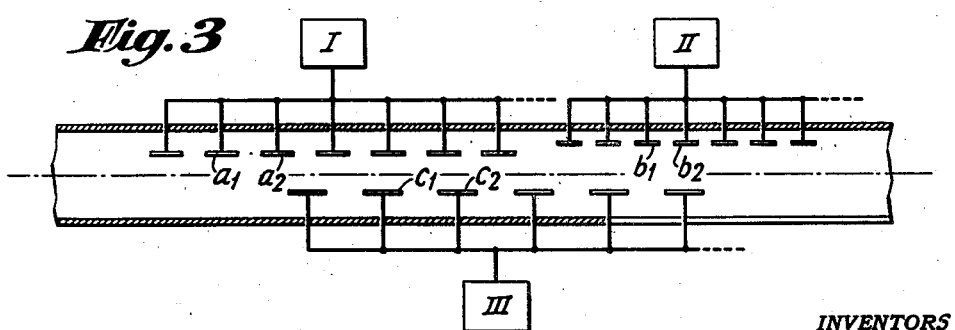
INVENTORS
HANS OTTO ROOSENSTEIN
AND PAUL GERHARD VIOLET
BY
ATTORNEY.

Patented Dec. 23, 1941

2,267,289

UNITED STATES PATENT OFFICE 2,267,289

TRANSMISSION SYSTEM

Hans Otto Roosenstein and Paul Gerhard Violet, Berlin, Germany, assignors to Telefunken Gesellschaft für Drahtlose Telegraphie m. b. H., Berlin, Germany, a corporation of Germany Application February 11, 1939, Serial No. 255,804
In Germany March 26, 1938

11 Claims. (Cl. 178—44)

It is known to transmit electromagnetic waves of very high frequency in hollow metal tubes without any inner conductor through electromagnetic excitation of the dielectric filling the tube. Electrical waves are hereby spoken of if an electric field strength exists in the direction of the axis of the tube, and magnetic waves if a magnetic field strength appears in the direction of the axis of the tube. The theory shows that in the case of round tubes the distribution of the field in the hollow space along the radius is determined by the Bessel function, whereby either the electric field meets the walls of the tube at right angles or else is zero at said walls. The field distribution along the axis is determined by sine functions whereby the appearing wavelength not only depends on the frequency but also on the radius of the tube and certain roots of the Bessel functions which correspond to the existing conditions of excitation. The present invention has for its object to utilize a special type of this wave, namely the circularly symmetrical one for the purpose of transmitting several signals at the same time with the same frequency. For the purpose of explanation, there will now be described by reference to Fig. 1 the course taken by the electrical field strength as a function of the distance from the tube axis. According to the Bell System Technical Journal, No. XV, page 316, 1936, the following formula can be written for this field strength in cylinder-coordinates $z$, $r\theta$:

$$E_z = A \cdot J_n(kr) \cdot \cos n\theta \cdot e^{i\omega t \pm \gamma z} \quad (1)$$

In this equation $A$ is a constant, $J_n(kr)$ is the Bessel function the $n$th order, whereby $kr$ is any one of the discrete solutions. $\omega$ is the circular frequency and $\gamma$ is the phase while $t$ is the time coordinate.

The circularly symmetrical waves to which the present invention refers are obtained when considering in this formula $n=0$ so that there is:

$$E_z = A \cdot J_0(kr) \cdot e^{i\omega t \pm \gamma z} \quad (2)$$

This equation permits of an infinite number of solutions which are determined by the limit condition, namely that the field intensity is to be equal to zero at the wall of the tube. The Bessel function of the 0-order appearing in the equation has an infinite number of zero places and therefore there are an infinite number of discrete values of $k$ which satisfy the equation. For each value of $k$ there exists a field intensity distribution which, as already stated, is to have zero value at the tube wall. Fig. 1 shows three first-field distributions $E_I$, $E_{II}$, and $E_{III}$, admitted by the equation.

Formula 1 also signifies that at one and the same frequency all these field distributions are theoretically possible. Therefore, they can be sent out separately. The present invention shows a way also to receive them separated from one another.

In accordance with the invention, several electrical oscillations of same frequency but different oscillation patterns (different values of $k$) excited in a hollow tube are separated by providing in the hollow tube a number of receiving organs for the reception of each of these oscillations whose output potentials are combined as to amplitude and phase, such that the sum of the receiving potentials will be zero for all oscillation patterns except that to be received.

For practicing this method, two possible arrangements will be explained: In the first arrangement various receiving organs are provided and distributed over the cross section of the tube and the reception obtained with these organs is combined in such manner that for each desired transmission channel all waves which can be received are suppressed with the exception of one. This condition can be explained mathematically in the following way.

When assuming (see Fig. 1) that the receiving organs I, II, III are spaced from the tube axis by $r_1$, $r_2$, $r_3$, the wave $J$ is expressed mathematically by:

$$E_I = J_0(k_I r) \cdot e^{pt} \text{ with } k_I R = 2.40$$

(first zero place of the Bessel function). Furthermore, there is:

$$E_{II} = J_0(k_{II} r) \cdot e^{pt} \text{ with } k_{II} R = 5.52$$

(second zero place), and $$E_{III} = J_0(k_{III} r) \cdot e^{pt} \text{ with } k_{III} R = 8.65$$

(third zero place). $E_I$, $E_{II}$, and $E_{III}$ represent the field intensities of the three waves. $R$ is the radius of the tubular conductor. The receiving organ having the distance $r_1$ from the tube axis receives a voltage expressed by:

$$V_1 = J_0(k_I r_1) + J_0(k_{II} r_1) + J_0(k_{III} r_1)$$

In the same manner the receiving voltages $V_2$ and $V_3$ for the other antennas can be calculated. Each of the individual antennas thus receives from each of the individual waves a certain part. Now, in accordance with the invention, through combination of the receiving potentials in an arrangement K the total combined potential of all waves I, II, III is caused to vanish with the exception of one. This will be done by way of calculation in the following for the case that this one wave, i. e., the wave which is to be received, is the wave J. The equations showing that the receiving potential of the waves II and III is zero read as follows:

$$0 = \mu J_0(k_{II}r_1) + \nu J_0(k_{II}r_2) + \lambda J_0(k_{II}r_3)$$
$$0 = \mu J_0(k_{III}r_1) + \nu J_0(k_{III}r_2) + \lambda J_0(k_{III}r_3) \quad (3)$$

and from these equations there can be found as is known in a mathematically unequivocal manner the proportion of the "amplitudes" $\mu$, $\nu$ and $\lambda$. Hence, it is possible to receive one wave of the three waves I, II and III which are sent through the tube with the same frequency, and to filter out the other two.

The combination of the individual receiving voltages in the arrangement K can be carried out in different ways. For instance, it may be done directly in the high frequency range by applying the individual received voltages across voltage dividers having suitable proportions of the voltage division and which are applied to a common electrode. Also, an electrical separation may be achieved by carrying out later, after passage through one or several tube stages and eventually in the intermediate frequency range or audio frequency range, a combination of the individual voltages with the suitable amplitudes $\mu$, $\nu$ and $\lambda$. A particular mode of construction is possible if only the waves I and II are to be separated. In this case the receiving organ for the wave I can be set up at a distance $r_{IIO}$, whereby the wave II will not be received because it just is zero at this place according to Fig. 1. Obviously, such simple circuits may also be used to separate two other waves.

No definite rules are required as regards the construction of the actual receiving circuit elements. In this connection it should simply be borne in mind that for the benefit of an increase of the receiving field strength and improvement of the circular symmetry, it is advisable to have circular symmetrical receiving antennas. The arrangement may, for instance, be that shown in Fig. 2, representing a so-called dipole ring in which the individual dipoles are connected by energy lines of suitable phase measure such as is customary in large directional radiators.

The second type of arrangements for the separation of the various wave shapes according to the invention is based upon the teaching that the speed of propagation of the individual waves in the hollow tube differ from each other, in other words they have different wavelengths. This is seen from the cited work of Carson. A system of receiving organs having in the direction of the tube a period equal to that of the wavelength of the received signal will assure for these wavelengths an especially favorable reception. For the reception of different waves hence, according to the invention, different systems of receiving organs are employed whose periods in the direction of the tube are identical to the period of the wave to be received. As an example thereof there is shown in Fig. 3 the arrangement of three receiving systems for the reception of the three wavelengths indicated in Fig. 1. In this figure there is $a_1$, $a_2$ ... $a_n$ the antennas for the reception of the wave I, and $b_1$, $b_2$ ... $b_n$ are the antennas for the reception of the wave II, and $c_1$, $c_2$ ... $c_n$ are the antennas for the reception of the wave III. The antennas may as such have any desired shapes. It is only necessary that the lines combining the reception of the antennas have the proper phase measure. The individual groups of receiving organs are arranged preferably in distances $z$ from the tube axis in which the amplitude of the oscillation to be received is as large as possible. As seen from Fig. 1, the maxima of the Bessel functions representing the different oscillations lie in fact on different radii.

The above mentioned receiving method has been explained herein for a wave having, according to Formula 1, a component of the electrical field intensity in the direction of the tube axis. However, among the circular symmetrical waves, there are also such which do not have such a component, namely the so-called $H_0$ waves; these have a component of the magnetic field in the direction of the tube axis. For these waves, similar conclusions exist which need not be elaborated on herein, and corresponding arrangements, according to the invention, can be provided which serve for the separation of the individual oscillation shapes.

What is claimed is:

1. In a wave guide having therein a desired electromagnetic wave of one field distribution pattern and undesired electromagnetic waves of the same frequency but of other field distribution patterns, the method of reception which includes separately collecting the waves of different field distribution patterns in the interior of said guide and combining the collected potentials of the desired and undesired waves in such manner that the sum of these potentials will be zero for all field distribution patterns except for that of the desired wave.

2. In combination with a wave guide comprising a metallic hollow tube, means for transmitting through the interior of said tube a plurality of waves of the same frequency but of different field distribution patterns, a plurality of spaced receiving pick-ups in the interior of said tube remotely located with respect to said transmitting means, a feeder line individual to each of said receiving pick-ups, and means for combining the output energies in said feeder lines in such amplitude and phase as to suppress all waves except the one to be received.

3. In combination with a wave guide comprising a metallic hollow tube, means for transmitting through the interior of said tube a plurality of waves of the same frequency but of different field distribution patterns, a plurality of spaced receiving pick-ups in the interior of said tube remotely located with respect to said transmitting means, there being a pick-up for each wave, said pick-ups being located at different radial distances from the axis of said tube, said distances being so chosen that the amplitude of the particular wave to be received on any one pick-up is a maximum, a feeder line individual to each of said receiving pick-ups, and means for combining the output energies in said feeder lines in such amplitude and phase as to suppress all waves except the one to be received.

4. In combination with a wave guide comprising a metallic hollow tube, means for transmitting through the interior of said tube a plurality of waves of the same frequency but of different field distribution patterns, a plurality of spaced receiving dipole antennas in the interior of said tube remotely located with respect to said transmitting means, there being a dipole antenna for each wave, said dipole antennas being located at different radial distances from the axis of said tube, said distances being so chosen that the amplitude of the particular wave to be received on any one antenna is a maximum, a feeder line individual to each of said receiving dipole antennas, and means for combining the output energies in said feeder lines in such amplitude and phase as to suppress all waves except the one to be received.

5. In combination with a wave guide comprising a metallic hollow tube, means for transmitting through the interior of said tube a plurality of waves of the same frequency but of different field distribution patterns, a plurality of groups of spaced receiving pick-ups in the interior of said tube remotely located with respect to said transmitting means, there being a group of spaced pick-ups for each wave which is located along a portion of the length of said tube the same radial distance from the axis of the tube, the pick-ups for different waves being located at different radial distances from the axis of said tube, said radial distances being so chosen that the amplitude of the particular wave to be picked up by any one group is a maximum, means for additively combining the energies received by the pick-ups in each group, and means for combining the energies received by said groups in such amplitude and phase that the sum of the received potentials of certain waves will be reduced to zero.

6. In a wave guide having therein a desired wave of one field distribution pattern, and undesired waves of other field distribution patterns, the method of reception which includes separately collecting the waves of different field distribution patterns and combining the collected energies of the desired and undesired waves in such phase relation that only the undesired wave energy cancels out.

7. In combination with a wave guide comprising a tube, means for transmitting through the interior of said tube a plurality of waves of the same frequency but of different field distribution patterns, a plurality of spaced receiving pick-ups in the interior of said tube remotely located with respect to said transmitting means, a feeder line individual to each of said receiving pick-ups, and means for combining the output energies in said feeder lines in such amplitude and phase as to suppress all waves except the one to be received.

8. In combination with a wave guide comprising a tube, means for transmitting through the interior of said tube a plurality of waves of the same frequency but of different field distribution patterns, a plurality of spaced receiving pick-ups in the interior of said tube remotely located with respect to said transmitting means, and means for combining the energies in said pick-ups in such amplitude and phase as to suppress all waves except the one to be received.

9. In combination with a wave guide comprising a tube, means for transmitting through the interior of said tube a plurality of waves of the same frequency but of different field distribution patterns, a plurality of spaced receiving pick-ups in the interior of said tube remotely located with respect to said transmitting means, there being a pick-up for each wave, said pick-ups being located at different radial distances from the axis of said tube, said distances being so chosen that the amplitude of the particular wave to be received on any one pick-up is a maximum, a feeder line individual to each of said receiving pick-ups, and means for combining the output energies in said feeder lines in such amplitude and phase as to suppress all waves except the one to be received.

10. A wave guide having means for launching in said guide a plurality of waves of the same frequency but of different field distribution patterns, a plurality of spaced receiving pick-ups in the interior of said guide remotely located with respect to said launching means, a feeder line individual to each of said receiving pick-ups, and means for combining the output energies in said feeder lines in such amplitude and phase as to suppress all waves except the one to be received.

11. A wave guide having therein a plurality of waves of the same frequency but of different field distribution patterns, a plurality of spaced receiving pick-ups in the interior of said wave guide located at different radial distances from the axis of said guide, and means for combining the energies in said pick-ups in such amplitude and phase as to suppress all waves except the one to be received.

HANS OTTO ROOSENSTEIN.
PAUL GERHARD VIOLET.